United States Patent [19]
Hartley et al.

[11] Patent Number: 4,959,045
[45] Date of Patent: Sep. 25, 1990

[54] FILTER SOCKS

[76] Inventors: Philip J. Hartley, 24 Ardoyne House, Pembroke Park, Ballsbridge, Dublin 4, Ireland; James Walshe, 120 The Coppice, Woodfarm Acres, Palmerston, Dublin, Ireland

[21] Appl. No.: 286,314

[22] Filed: Dec. 19, 1988

Related U.S. Application Data

[63] Continuation of Ser. No. 809,943, Dec. 17, 1985, abandoned.

[30] Foreign Application Priority Data

Dec. 21, 1984 [IE] Ireland .................................. 3339/84

[51] Int. Cl.$^5$ .......................... B01D 27/06; B31D 5/04
[52] U.S. Cl. .................................... 493/254; 493/308;
493/941; 210/497.2; 210/486; 55/381; 55/DIG. 5
[58] Field of Search ...................... 210/323.2, 448, 452, 210/497.01, 497.2, 346, 461, 486, 487; 55/381, 382, DIG. 2, DIG. 5, DIG. 43, DIG. 45; 493/308, 941, 310, 343, 344, 349, 356, 379, 386, 393, 405, 408, 453, 459

[56] References Cited

U.S. PATENT DOCUMENTS

| | | | |
|---|---|---|---|
| 408,858 | 8/1889 | Seymour | 493/308 |
| 1,184,485 | 5/1916 | Mummert | 55/381 |
| 1,585,246 | 5/1926 | Hay | 210/448 |
| 1,627,795 | 5/1927 | Manning | 210/452 |
| 2,832,433 | 4/1958 | Brace | 55/381 |
| 3,037,634 | 6/1962 | Mills | 210/323.2 |
| 3,199,275 | 8/1965 | Fesco | 210/497.2 |
| 3,327,864 | 6/1967 | Ball et al. | 210/497.01 |
| 3,444,791 | 5/1969 | Honzel | 210/497 |
| 4,015,961 | 4/1977 | Howard et al. | 55/381 |
| 4,292,180 | 9/1981 | Zylka et al. | 210/497.01 |
| 4,311,477 | 1/1982 | Kitamura et al. | 493/195 |
| 4,545,833 | 10/1985 | Tafara | 210/348 |

Primary Examiner—Richard V. Fisher
Assistant Examiner—Wanda L. Millard
Attorney, Agent, or Firm—Curtis, Morris & Safford

[57] ABSTRACT

A construction of filter sock which has a panel (1) with two leaves (2,3) of unequal width such that when folded along a foldline (4) the leaves form a double leaf panel with a projecting side (9). The side (9) is folded back along a second fold line (11) over the free side (6) of leaf (2). The sides (6,9) and leaf (2) are secured together by an overlock stitching (13) to form a tube (12). The invention provides a method of making the filter sock.

4 Claims, 3 Drawing Sheets

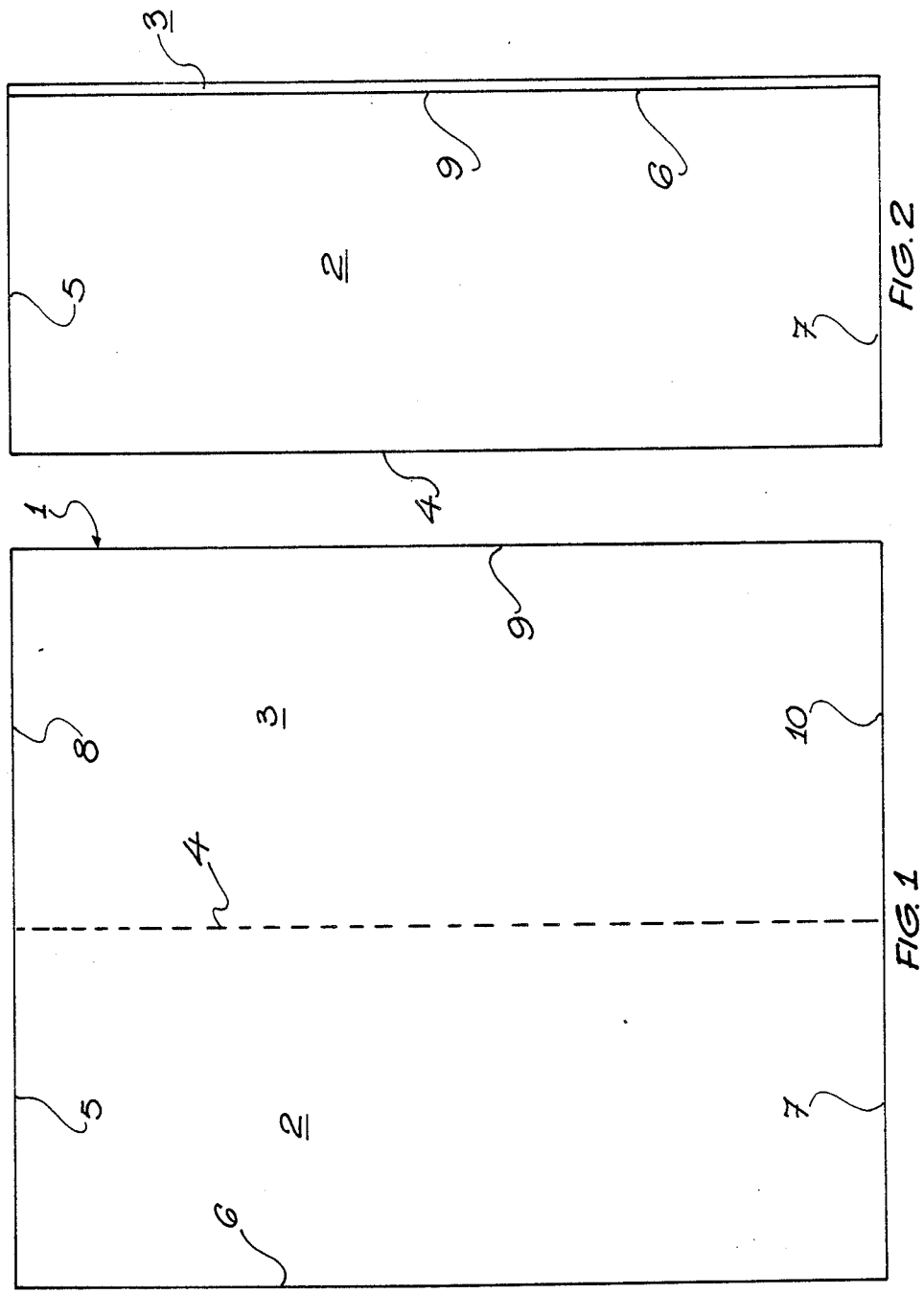

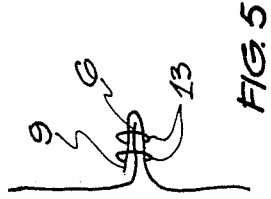
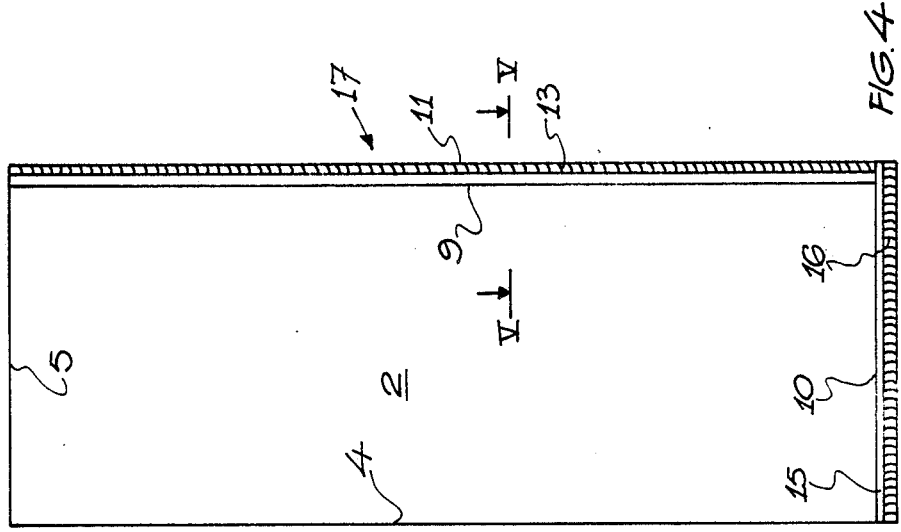
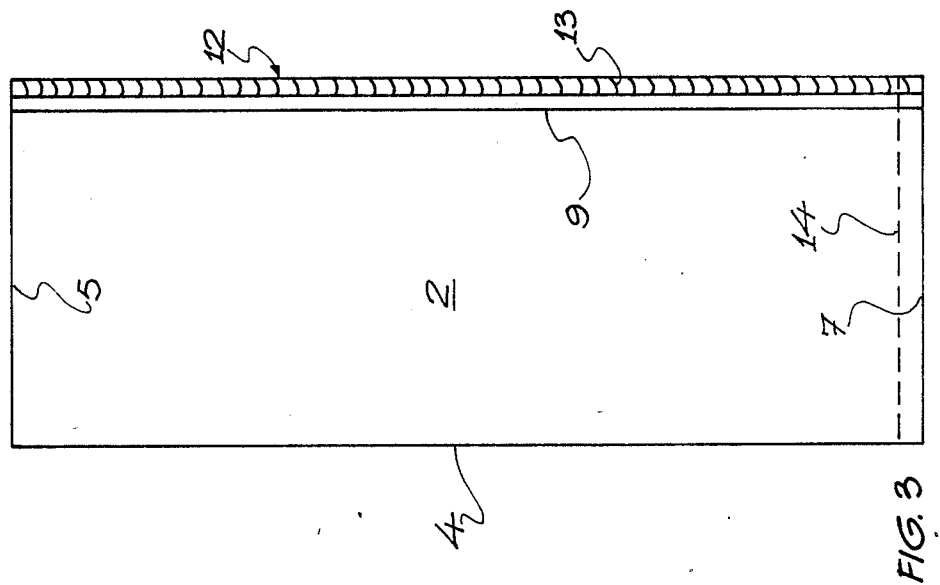

FILTER SOCKS

This application is a continuation of application Ser. No. 809,943, filed Dec. 17, 1985 now abandoned.

This invention relates to a filter sock.

A filter sock is used for filtering a liquid, in particular milk. Generally, the filter sock comprises a material which will allow the milk to pass through either by direct filtration or by indirect filtration but denies passage to sediment.

In direct filtration, the milk simply enters the sock via the open mouth thereof. The pressure of the milk entering the sock will force the milk from inside the sock to the exterior thereby filtering the milk.

In indirect filtration, the sock is generally mounted on a frame or cage and the milk is pumped from outside the sock to the interior thereof from which the filtered milk leaves the sock via the open mouth thereof.

For both direct and indirect filtration, the known sock generally comprises a generally rectangularly shaped piece of material suitable for filtering, which material is folded over on itself so that two opposing longitudinal edges overlap. The overlap is then stitched. The stitching used may be a simple stitch e.g. a lock stitch or a chain stitch. For an even more secure closure, an overlock stitch may be employed.

It will be appreciated that regardless of the stitch type used, in order to complete the sock, a similar stitch to that employed on the overlapping longitudinal edges is used along one of the other transverse overlaps.

Despite the use of even the overlock stitch, the pressure of the milk within the sock and/or the constant movement of the milk acting on the sock when the sock is mounted on the frame stretches the stitching and tends to provide holes which will allow the passage of undesirable sediment of at least a low micron size to pass through to the filtered milk.

Furthermore, depending on the pressure, the constant stretching of the stitching can quickly lead to bursting of the filter sock.

It is an object of the present invention to overcome these problems.

The invention therefore provides a filter sock which comprises a panel member having a pair of leaves of unequal width divided by a first fold line, the leaves being doubled over in use to form a double leaf panel; the free end of the wider leaf is folded along a second fold line in the direction of the first fold line over the free end of the other leaf; the free end of each of the leaves and the wider panel members are secured by stitching to form a tube; and one mouth of the tube is closed by folding each of the panel members along a transverse fold line in the direction of the other mouth of the tube thereby forming a hem which is secured to the panel members by stitching.

Preferably, the stitching is a lock stitch.

Preferably, the stitching is a chain stitch.

Preferably the stitching comprises an overlock stitch.

The invention also provides a method of making a filter sock which comprises providing a panel member having a pair of leaves of unequal width divided by a first fold line; doubling the leaves over to form a double leaf panel; folding the free end of the wider leaf along a second fold line in the direction of the first fold line over the free end of the other leaf; securing the free end of each of the leaves and the wider panel members by stitching to form a tube; closing one mouth of the tube by folding each of the panel members along a transverse fold line in the direction of the other mouth of the tube thereby forming a hem; and securing the panel members by stitching.

The invention will be understood in greater detail from the following description of a preferred embodiment thereof given by way of example only and with reference to the accompanying drawings in which:

FIG. 1 is a plan view of a panel member for forming a filter sock according to the invention;

FIG. 2 is the panel member of FIG. 1 folded over on itself to form a double leaf panel;

FIG. 3 is the panel of FIG. 2 secured to form a tube;

FIG. 4 is the tube of FIG. 3 one end of which is folded over to form a filter sock according to the invention;

FIG. 5 is a transverse cross-sectional view of part of the tube of FIG. 4 taken along the line V—V of FIG. 4 and viewed in the direction of the associated arrows.

Figure 6:
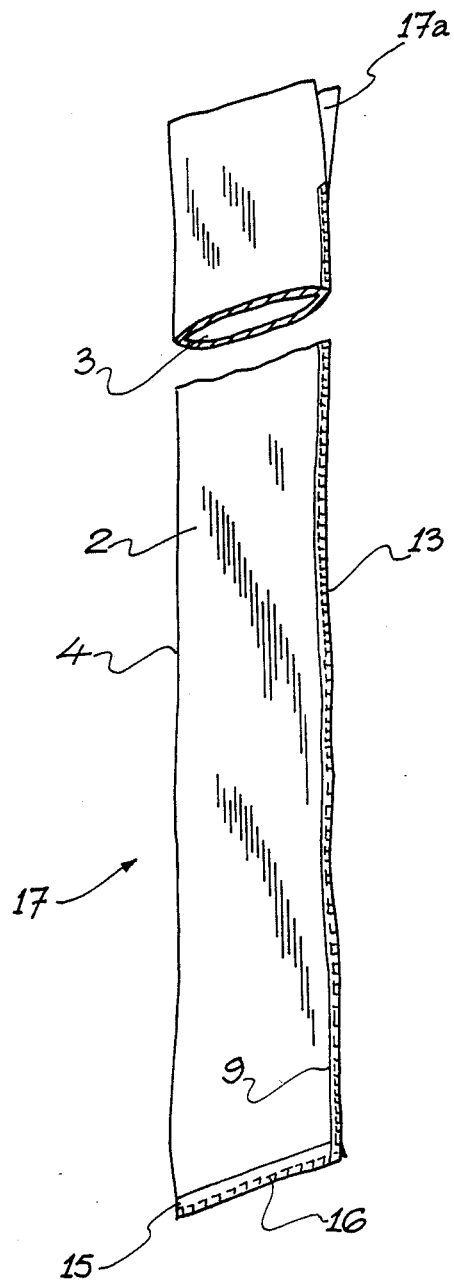
FIG. 6 is a perspective view of a filter sock according to the invention.

Referring now to the drawings, in which like numerals refer to similar parts of several of the drawings, there is shown a panel member 1 of a material suitable for filtering a liquid such as milk. The panel member 1 has a pair of leaves 2, 3 of unequal width divided by a first fold line 4. The leaf 3 is wider than the leaf 2. For descriptive purposes, the leaf 2 has sides 5, 6 and 7 and the leaf 3 has sides 8, 9 and 10. The leaves 2, 3 are doubled over along the first fold line 4 to form a double leaf panel with the side 9 projecting beyond the side 6 as shown in FIG. 2 of the drawings.

A second fold line 11 is generated on the leaf 3 and the side or free end 9 is folded along the second fold line 11 in the direction of the first fold line 4 and over the side or free end 6. The sides 6, 9 and the leaf 2 are secured by providing overlock stitching 13 thereby forming a tube 12.

One of the mouths of the tube 12 is closed by generating a transverse fold line 14 and folding the sides 7, 10 in the direction of the other mouth of the tube thereby forming a hem 15. The mouth is sealed by providing overlock stitching 16 so as to secure the hem 15 and the leaves 2, 3 together thereby forming a sock 17.

In use for direct filtration, the open mouth of the sock 17 is attached to a pipe (not shown) and milk is allowed to enter the interior of the sock 17 and filtered outwardly through the walls thereof. The pressure of the milk in the sock 17 tends to force the overlapping components together thereby minimising the stretching action on the stitching and maximising the sealing action of the overlapping components.

For use in indirect filtration, the sock 17 is placed over a frame or cage and milk is pumped into the sock via the walls thereof and the filtered milk is allowed to escape via the open mouth. Again, the frame or cage tends to force the overlapping components together thereby minimising the stretching action on the stitching and maximising the sealing of the overlapping components. With particular reference to FIG. 6 of the drawings, the sock 17 is provided with a pair of slits 17a to facilitate the placement of the sock 17 over the frame or cage.

Thus, significant advantages of the sock 17 according to the invention include improved quality of filtered milk by denying passage to low micron sediment which heretofore escaped by virtue of the stitching, and the ability of the filter to remain useable for longer periods by virtue of the overlapping components.

We claim:

1. A method of making a filter sock which comprises cutting a panel member having opposite substantially parallel free edges, doubling the panel member over along a line substantially parallel to the said free edges to form a panel with two leaves of which a first leaf is wider than a second leaf, folding the free edge of the first leaf around the free edge of the second leaf such that said panel exhibits substantially constant width along its length, stitching all together the free edges of each of the leaves and that portion of the second leaf on the side opposite to its folded over free edge to form a tube having an axis substantially parallel to said stitched free edges and an open mouth at each end, closing one mouth of the tube by folding each of the leaves along a traverse fold line in the direction of the second open mouth of the tube thereby forming a hem and securing the hem to the leaves by stitching.

2. A method as claimed in claim 1 wherein the stitching is a lock stitch.

3. A method as claimed in claim 2 wherein the stitching comprises a chain stitch.

4. A method as claimed in claim 1 wherein the stitching further comprises an overlock stitch.

* * * * *